US008996751B2

(12) United States Patent
Pereira et al.

(10) Patent No.: US 8,996,751 B2
(45) Date of Patent: Mar. 31, 2015

(54) AUTONOMOUSLY INITIATED INFORMATION STORAGE DEVICE PARAMETER CHANGE NOTIFICATION

(71) Applicant: Dell Products, LP, Round Rock, TX (US)

(72) Inventors: David M. Pereira, Austin, TX (US); James P. Giannoules, Round Rock, TX (US); Chandrashekar Nelogal, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 114 days.

(21) Appl. No.: 13/739,581

(22) Filed: Jan. 11, 2013

(65) Prior Publication Data
US 2014/0201396 A1 Jul. 17, 2014

(51) Int. Cl.
*G06F 13/38* (2006.01)
*G06F 11/00* (2006.01)

(52) U.S. Cl.
CPC ..................................... *G06F 13/38* (2013.01)
USPC .......................................... 710/15; 714/47.1

(58) Field of Classification Search
CPC ........... G06F 13/00; G06F 13/38; G06F 3/00; G06F 11/00
USPC ....................... 710/15–19; 711/111; 714/47.1
See application file for complete search history.

(56) References Cited

U.S. PATENT DOCUMENTS

| 5,890,014 | A  | * | 3/1999 | Long .................................. 710/8 |
| 6,412,045 | B1 | * | 6/2002 | DeKoning et al. ............ 711/135 |
| 6,722,570 | B1 |   | 4/2004 | Eisele |
| 6,792,460 | B2 | * | 9/2004 | Oulu et al. ..................... 709/224 |
| 6,918,134 | B1 | * | 7/2005 | Sherlock et al. ................ 725/76 |
| 7,231,476 | B2 | * | 6/2007 | Watt et al. ...................... 710/200 |
| 7,657,794 | B2 | * | 2/2010 | Ichikawa et al. ................ 714/42 |
| 2006/0047899 | A1 |   | 3/2006 | Ilda et al. |
| 2008/0126885 | A1 | * | 5/2008 | Tangvald et al. ................ 714/54 |
| 2008/0133624 | A1 | * | 6/2008 | Phillips et al. ................ 707/204 |
| 2012/0246386 | A1 | * | 9/2012 | Akutsu et al. ................. 711/103 |
| 2013/0132696 | A1 | * | 5/2013 | Tomida et al. ................ 711/165 |
| 2014/0108759 | A1 | * | 4/2014 | Iwamitsu et al. ............. 711/165 |

OTHER PUBLICATIONS

"Dual-Core Intel® Xeon® Processor 5100 Series Datasheet," Reference No. 313355-003, Aug. 2007 http://www.intel.com/Assets/PDF/datasheet/313355.pdf, (Section 6.3—Platform Environment Control Interface (PECI)).

"CPU Monitoring With DTS/PECI," Michael Berktold et al., Intel Corporation, paper 322683, Sep. 2010 http://download.intel.com/design/intarch/papers/322683.pdf.

"DDR3 migration to DDR4; DIMM Thermal Sensor and SPD Changes," Guru Prasad, NXP, BL Interface Products, Oct. 5, 2011, http://sites.amd.com/us/Documents/TFE2011_012NXP.pdf.

"System Memory Power and Thermal Management in Platforms Built on Intel® Centrino® Duo Mobile Technology," Intel Technology Journal, vol. 10, Issue 02, May 15, 2006, http://www.intel.com/technology/itj/2006/volume10issue02/art04_Memory_Power_Management/p01_abstract.htm.

U.S. Appl. No. 13/471,889, filed May 15, 2012.
U.S. Appl. No. 13/481,254, filed May 25, 2012.

* cited by examiner

*Primary Examiner* — Christopher Shin
(74) *Attorney, Agent, or Firm* — Larson Newman, LLP

(57) ABSTRACT

An information handling system includes a processor, a memory communicatively coupled to the processor, and an information storage device coupled to the processor via an input/output (I/O) bus for communicating I/O data between the processor and the information storage device. The device further receives a specification of reporting criteria for information storage device parameters.

20 Claims, 6 Drawing Sheets

| BYTE \ BIT | 7 | 6 | 5 | 4 | 3 | 2 | 1 | 0 |
|---|---|---|---|---|---|---|---|---|
| 0 | PS 533 | SPF 532 | | | Page Code (TBD) 531 | | | |
| 1 | Page Length 536 | | | | | | | |
| 2 | CTB 544 | TNE 543 | | MRIEO 542 | | Reserved 541 | | |
| 3 | Reserved 548 | | | IUFT 547 | | HystCount 546 | | |
| 4 | Notification Interval (seconds) 551 | | | | | | | |
| 5 | (MSB) Baseline Parameter Value | | | | | | | |
| 6 | | | | | | | | (LSB) 552 |
| 7 | Positive Parameter Value Range 553 | | | | | | | |
| 8 | Negative Parameter Value Range 554 | | | | | | | |
| 9 | (MSB) Current Parameter Value | | | | | | | |
| 10 | | | | Reserved 564 | | | | (LSB) 555 |
| 11 | TAM 565 | | TAM Code 563 | | | NRE 562 | | PRE 561 |

FIG. 5

AUTONOMOUSLY INITIATED INFORMATION STORAGE DEVICE PARAMETER CHANGE NOTIFICATION

FIELD OF THE DISCLOSURE

This disclosure generally relates to information handling systems, and more particularly relates to information storage devices.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Energy efficiency, and in particular thermal management, are factors in server computing platforms. One trend that is contributing to closer thermal monitoring of components in server computing platforms is the adoption of "fresh air cooling" initiatives, which may use cool outdoor air to remove heat from computer equipment, where the ambient temperature may vary frequently and may vary outside the normal operating temperature range for IT equipment.

When designing the overall thermal control system the mass storage devices (for example, hard disk drives (HDDs) and solid-state disks (SSDs)) are unavoidable sources of heat (and have sensitivity to heat) that must be considered. In current implementations of such a control system, the storage controller is typically the agent performing the interrogation of the device for temperature information. The design is often a polling model whereby the storage controller requests current temperature information from the device on a regular pre-determined interval, storing the value for later use by the thermal management system.

Periodic polling of storage devices degrades system performance in three ways. Firstly, in many of today's enterprise-class HDDs and SSDs, requesting temperature information has two negative impacts. The drive's internal queue management of commands is impacted negatively. The request for temperature information causes the drive to process all outstanding commands and block processing of future commands while the temperature polling request is outstanding, thus negating the drive's algorithms for processing commands in the most optimal manner regardless of the submission order. Also, the latency in completing the temperature request—tens to hundreds of milliseconds—leads to corresponding I/O latency increase. Such delays are unacceptable in today's high performance I/O subsystems, especially when designed to occur on a regular interval, regardless of whether the drive's temperature has changed or not. The problem is multiplied for configurations with more than a single storage device. Secondly, the temperature polling model has an inherent delay within the thermal management feedback loop. The information provided into the control system is only as current as the previous completed poll. The control system must wait for the next poll to determine whether further corrective action is warranted. As system designers require more up-to-date temperature information, there is a requirement to decrease the interval between temperature polls. Polling more frequently reduces the impact of the feedback delay, but reduces system performance. Thirdly, storage controller performance is compromised by the necessity of constantly polling all attached storage devices for temperature (or other parameter) values.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 5 is a block diagram illustrating a mode page in accordance with at least one embodiment;

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input/output (I/O) devices, such as a keyboard, a mouse, and a video display. The information handling system can also include one or more buses operable to transmit communications between the various hardware components.

Figure 1:
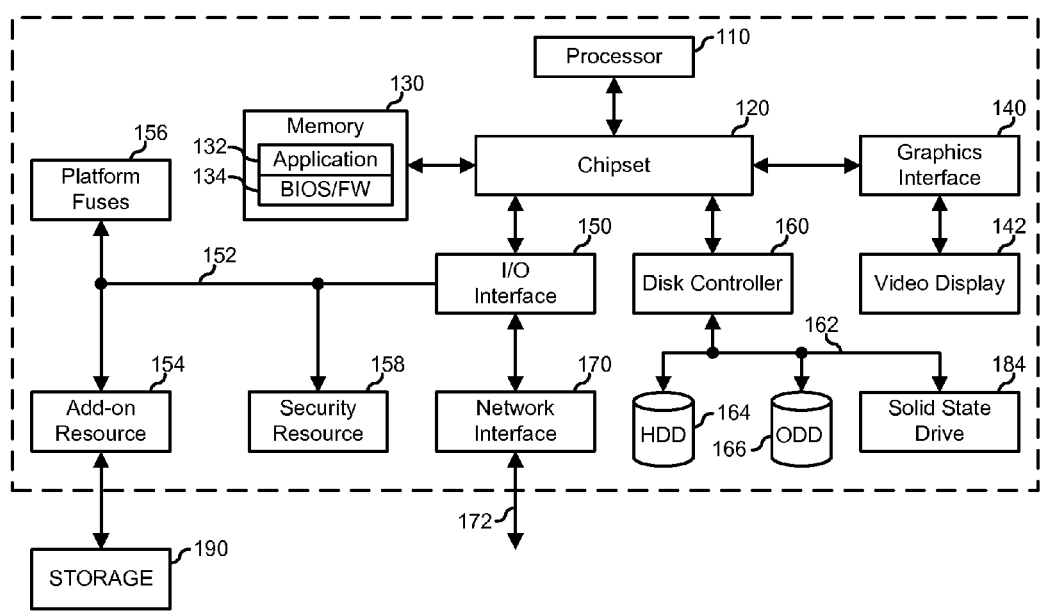
FIG. 1 is a block diagram illustrating an information handling system 100 in accordance with at least one embodiment of the disclosure.

FIG. 1 shows an information handling system 100 that includes a processor 110, a chipset 120, a memory 130, a graphics interface 140, an I/O interface 150, a disk controller 160, a network interface 170, and a solid state disk 184. In a particular embodiment, information handling system 100 is used to carry out one or more of the methods described herein. In another embodiment, one or more of the systems described herein are implemented in the form of information handling system 100. In one form, the information handling system 100 can be a computer system such as a server. As shown in FIG. 1, the information handling system 100 can include a first physical processor 110 and can further include additional physical processors. The first physical processor 110 can be coupled to a chipset 120 via a first host bus. Further, the additional physical processors can be coupled to the chipset 120 via one or more additional host buses. The chipset 120 can support multiple processors and can allow for simultaneous processing of multiple processors and support the exchange of information within information handling system 100 during multiple processing operations.

Chipset 120 is connected to and supports processor 110, allowing the processor to execute machine-executable code. In a particular embodiment, information handling system 100 includes one or more additional processors, and chipset 120 supports the multiple processors, allowing for simultaneous processing by each of the processors and permitting the exchange of information among the processors and the other elements of the information handling system. Chipset 120 can be connected to processor 110 via a unique channel, or via a bus that shares information among the processor, the chipset, and other elements of information handling system 100.

According to one aspect, the chipset 120 can be referred to as a memory hub or a memory controller. For example, the chipset 120 can include an Accelerated Hub Architecture (AHA) that uses a dedicated bus to transfer data between first physical processor 110 and an additional physical processor. For example, the chipset 120, including an AHA enabled-chipset, can include a memory controller hub and an I/O controller hub. As a memory controller hub, the chipset 120 can function to provide access to the first physical processor 110 using the first host bus and an additional physical processor using an additional host bus. The chipset 120 can also provide a memory interface for accessing memory 130 using a memory bus. In a particular embodiment, the first host bus, the additional host bus, and the memory bus may be individual buses or part of the same bus. The chipset 120 can also provide bus control and can handle transfers between the first host bus, the additional host bus, and the memory bus.

According to another aspect, the chipset 120 can be generally considered an application specific chipset that provides connectivity to various buses, and integrates other system functions. For example, the chipset 120 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 120. The chipset 120 can also be packaged as an application specific integrated circuit (ASIC).

Memory 130 is connected to chipset 120. Memory 130 and chipset 120 can be connected via a unique channel, or via a bus that shares information among the chipset, the memory, and other elements of information handling system 100. In another embodiment (not illustrated), processor 110 is connected to memory 130 via a unique channel. In another embodiment (not illustrated), information handling system 100 includes separate memory dedicated to each of the one or more additional processors. A non-limiting example of memory 130 includes static random access memory (SRAM), dynamic random access memory (DRAM), non-volatile random access memory (NVRAM), read only memory (ROM), flash memory, another type of memory, or any combination thereof.

Graphics interface 140 is connected to chipset 120. Graphics interface 140 and chipset 120 can be connected via a unique channel, or via a bus that shares information among the chipset, the graphics interface, and other elements of information handling system 100. Graphics interface 140 is connected to a video display 142. Other graphics interfaces (not illustrated) can also be used in addition to graphics interface 140 as needed or desired. Video display 142 includes one or more types of video displays, such as a flat panel display, another type of display device, or any combination thereof.

The information handling system 100 can also include a video graphics interface 140 that can be coupled to the chipset 120 using a video host bus. In one form, the video graphics interface 140 can be an Accelerated Graphics Port (AGP) interface to display content within a video display unit 142. Other graphics interfaces may also be used. The video graphics interface 140 can provide a video display output to the video display unit 142. The video display unit 142 can include one or more types of video displays such as a flat panel display (FPD) or other type of display device.

I/O interface 150 is connected to chipset 120. I/O interface 150 and chipset 120 can be connected via a unique channel, or via a bus that shares information among the chipset, the I/O interface, and other elements of information handling system 100. Other I/O interfaces (not illustrated) can also be used in addition to I/O interface 150 as needed or desired. I/O interface 150 is connected via an I/O interface 152 to one or more add-on resources 154. Add-on resource 154 is connected to a storage system 190, and can also include another data storage system, a graphics interface, a network interface card (NIC), a sound/video processing card, another suitable add-on resource or any combination thereof. At least one embodiment may be applied to an information storage device implemented, for example, as storage system 190 or, for example, as another data storage system provided using add-on resource 154. I/O interface 150 is also connected via I/O interface 152 to one or more platform fuses 156 and to a security resource 158. Platform fuses 156 function to set or modify the functionality of information handling system 100 in hardware. Security resource 158 provides a secure cryptographic functionality and includes secure storage of cryptographic keys. A non-limiting example of security resource 158 includes a Unified Security Hub (USH), a Trusted Platform Module (TPM), a General Purpose Encryption (GPE) engine, another security resource, or a combination thereof.

The information handling system 100 can also include an I/O interface 150 that can be connected via an I/O bus to the chipset 120. The I/O interface 150 can be connected to an I/O bus 152, which may be connected to at least one I/O device. The I/O bus 152 can include industry standard buses or proprietary buses and respective interfaces or controllers. For example, the I/O bus 152 can also include a Peripheral Component Interconnect (PCI) bus or a high speed PCI-Express bus. In one embodiment, a PCI bus can be operated at approximately 66 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the I/O bus 152 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 120 can be a chipset employing a Northbridge/Southbridge chipset configuration (not illustrated). For example, a Northbridge portion of the chipset 120 can communicate with the first physical processor 110 and can control interaction with the memory 130, the I/O interface 150 that can be operable as a PCI bus, and activities for the video graphics interface 140. The Northbridge portion can also communicate with the first physical processor 110 using first host bus and with any additional physical processor using an additional host bus. The chipset 120 can also include a Southbridge portion (not illustrated) of the chipset 120 and can handle I/O functions of the chipset 120. The Southbridge portion can manage the basic forms of I/O such as Universal Serial Bus (USB), serial I/O, audio outputs, Integrated Drive Electronics (IDE), and ISA I/O for the information handling system 100.

Disk controller 160 is connected to chipset 120. Disk controller 160 and chipset 120 can be connected via a unique channel, or via a bus that shares information among the chipset, the disk controller, and other elements of information handling system 100. Other disk controllers (not illustrated) can also be used in addition to disk controller 160 as needed or desired. Disk controller 160 includes a disk interface 162. Disk controller 160 is connected to one or more disk drives via disk interface 162. Such disk drives include a hard disk drive (HDD) 164, and an optical disk drive (ODD) 166, and can include one or more disk drive as needed or desired. ODD 166 can include a Read/Write Compact Disk (RW-CD), a Read/Write Digital Video Disk (RW-DVD), a Read/Write mini Digital Video Disk (RW mini-DVD, another type of optical disk drive, or any combination thereof. Additionally, disk controller 160 is connected to a solid-state drive 184 via disk interface 162. Additionally or alternatively, solid-state drive 184 may be interfaced to disk controller 160 via an interface which may include industry standard buses such as USB or IEEE 1394 (Firewire) or proprietary buses, or any combination thereof. Solid-state drive 184 may be disposed within information handling system 100 or may be provided as an external peripheral.

Network interface device 170 is connected to I/O interface 150. Network interface 170 and I/O interface 150 can be coupled via a unique channel, or via a bus that shares information among the I/O interface, the network interface, and other elements of information handling system 100. Other network interfaces (not illustrated) can also be used in addition to network interface 170 as needed or desired. Network interface 170 can be a network interface card (NIC) disposed within information handling system 100, on a main circuit board such as a baseboard, a motherboard, or any combination thereof, integrated onto another component such as chipset 120, in another suitable location, or any combination thereof. Network interface 170 includes a network channel 172 that provide interfaces between information handling system 100 and other devices (not illustrated) that are external to information handling system 100. Network interface 170 can also include additional network channels (not illustrated).

Information handling system 100 includes one or more application programs 132, and Basic Input/Output System and Firmware (BIOS/FW) code 134. BIOS/FW code 134 functions to initialize information handling system 100 on power up, to launch an operating system, and to manage input and output interactions between the operating system and the other elements of information handling system 100. In a particular embodiment, application programs 132 and BIOS/FW code 134 reside in memory 130, and include machine-executable code that is executed by processor 110 to perform various functions of information handling system 100. In another embodiment (not illustrated), application programs and BIOS/FW code reside in another storage medium of information handling system 100. For example, application programs and BIOS/FW code can reside in HDD 164, in a ROM (not illustrated) associated with information handling system 100, in an option-ROM (not illustrated) associated with various devices of information handling system 100, in storage system 190, in a storage system (not illustrated) associated with network channel 172, in another storage medium of information handling system 100, or a combination thereof. Application programs 132 and BIOS/FW code 134 can each be implemented as single programs, or as separate programs carrying out the various features as described herein.

Figure 2:
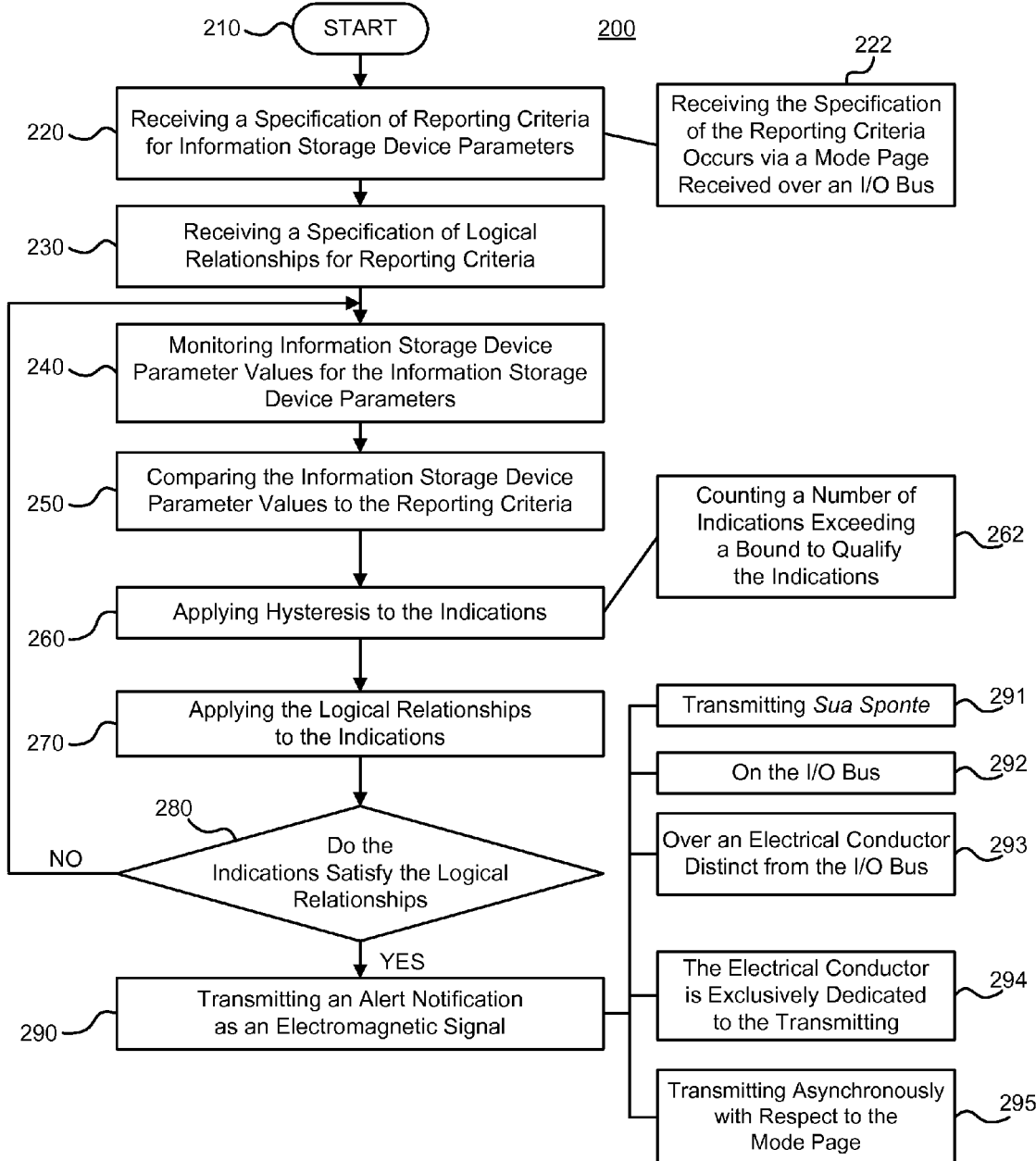
FIG. 2 is a flow diagram illustrating a method in accordance with at least one embodiment.

FIG. 2 shows a method 200 that begins at block 210. In block 220, a specification of reporting criteria for information storage device parameters is received. The information storage parameters may include any parameters the values of which are accessible to the information storage device. As examples, the information storage device parameters may include any of temperature, vibration, humidity, barometric pressure, head fly height, information storage device reliability metrics, and the like. The reporting criteria may include upper bounds, lower bounds, a range between a lower bound and an upper bound, ranges beyond an upper bound and a lower bound, values to which information storage device parameters are compared for equality, values to which information storage device parameters are compared for inequality, and the like. As shown by block 222, in accordance with at least one embodiment, the receiving the specification of the reporting criteria for information storage device parameters occurs via a mode page received over an I/O bus. As an example, the mode page may be a SCSI mode page. From block 220, the method continues to block 230. In block 230, a specification of logical relationships for reporting criteria is received. As an example, the logical relationships may be Boolean logical relationships, such as AND, OR, NAND, NOR, XOR, NOT, and the like and may relate instances of reporting criteria to one another.

Such logical relationships may be received with the reporting criteria or separately from the reporting criteria. As an example, the logical relationships may be received on the same mode page as the reporting criteria, on a different mode page as the reporting criteria, or by a different medium than a mode page. From block 230, the method continues to block 240. In block 240, information storage device parameter values for the information storage device parameters are monitored. As an example, an information storage device may autonomously monitor the information storage device parameters pertaining to the reporting criteria. Such monitoring may occur continuously, or the information storage device may periodically measure information storage device parameter values of such information storage device parameters. From block 240, the method continues to block 250. In block 250, the information storage device parameter values are compared to the reporting criteria. As an example, the information storage device may compare each of the reporting criteria to its corresponding information storage device parameter to obtain indications of whether or not the reporting criteria have been satisfied by the information storage device parameter values.

From block 250, the method continues to block 260. In block 260, hysteresis is applied to the indications. As shown by block 262, in accordance with at least one embodiment, applying hysteresis to the indications may be performed by counting a number of indications exceeding a bound to qualify the indications. As an example, the counting may be a counting of units of time during which the indications show the reporting criteria to be satisfied, a counting of numbers of indications showing the reporting criteria to be satisfied, a counting of a rate at which the indications show the reporting criteria to be satisfied, or the like. From block 260, the method continues to block 270. In block 270, the logical relationships are applied to the indications. As an example, a logical operator, such as an AND, OR, NAND, NOR, XOR, or NOT may be applied to a first of the reporting criteria and a second of the reporting criteria. If additional reporting criteria are specified, a logical operator may be applied to an additional one of the additional reporting criteria and the result of the applying the previous logical operator to the previous reporting criteria until logical operators have been applied to all of the specified reporting criteria.

From block 270, the method continues to decision block 280. In decision block 280, a decision is made whether or not the indications satisfy the logical relationships. If not, the method returns to block 240. If so, the method continues to block 290. In block 290, an alert notification is transmitted as an electromagnetic signal. As shown by block 291, in accordance with at least one embodiment, the information storage device may transmit the alert notification sua sponte. As shown by block 292, in accordance with at least one embodiment, the information storage device may transmit the alert notification on the I/O bus. As shown by block 293, the information storage device may transmit the alert notification over an electrical conductor distinct from the I/O bus. As shown by block 294, the electrical conductor may be exclusively dedicated to the transmitting the alert notification. As shown by block 295, the information storage device may transmit the alert notification asynchronously with respect to the mode page.

Figure 3:
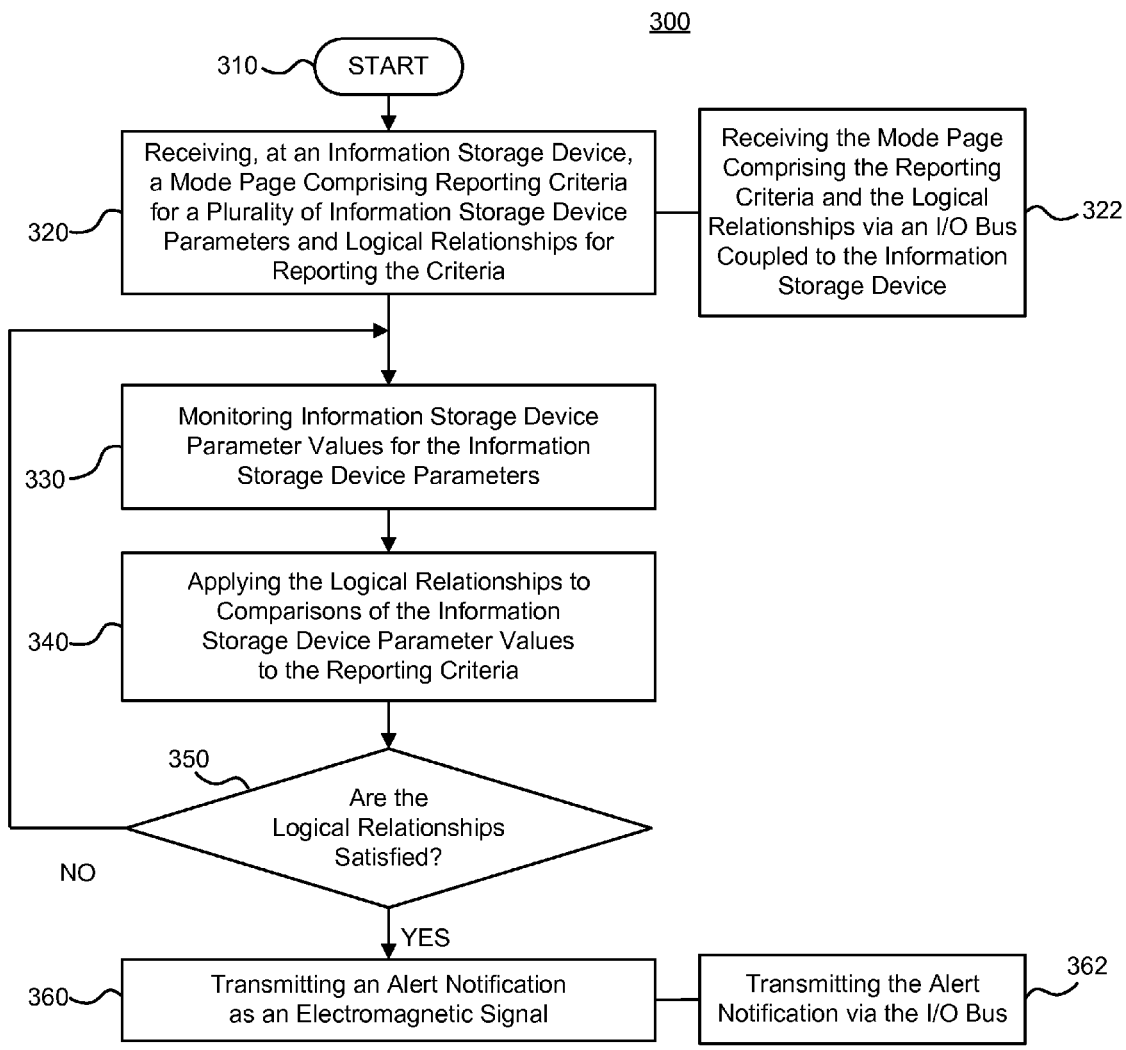
FIG. 3 is a flow diagram illustrating a method in accordance with at least one embodiment.

FIG. 3 shows a method 300 that begins at block 310. In block 320, an information storage device receives a mode page comprising reporting criteria for a plurality of information storage device parameters and logical relationships for the reporting criteria. From block 320, the method continues to block 330. In block 330, the information storage device monitors information storage device parameter values for the plurality of information storage device parameters. From block 330, the method continues to block 340. In block 340, the information storage device applies the logical relationships to comparisons of the information storage device parameter values to the reporting criteria. From block 340, the method continues to decision block 350. In decision block 350, a decision is made as to whether or not the logical relationships are satisfied. If not, the method returns to block 330. If so, the method continues to block 360. In block 360, the information storage device transmits an alert notification as an electromagnetic signal. As shown in block 362, in accordance with at least one embodiment, the information storage device may transmit the alert notification via an I/O bus, wherein the I/O bus is coupled to the information storage device.

Figure 4:
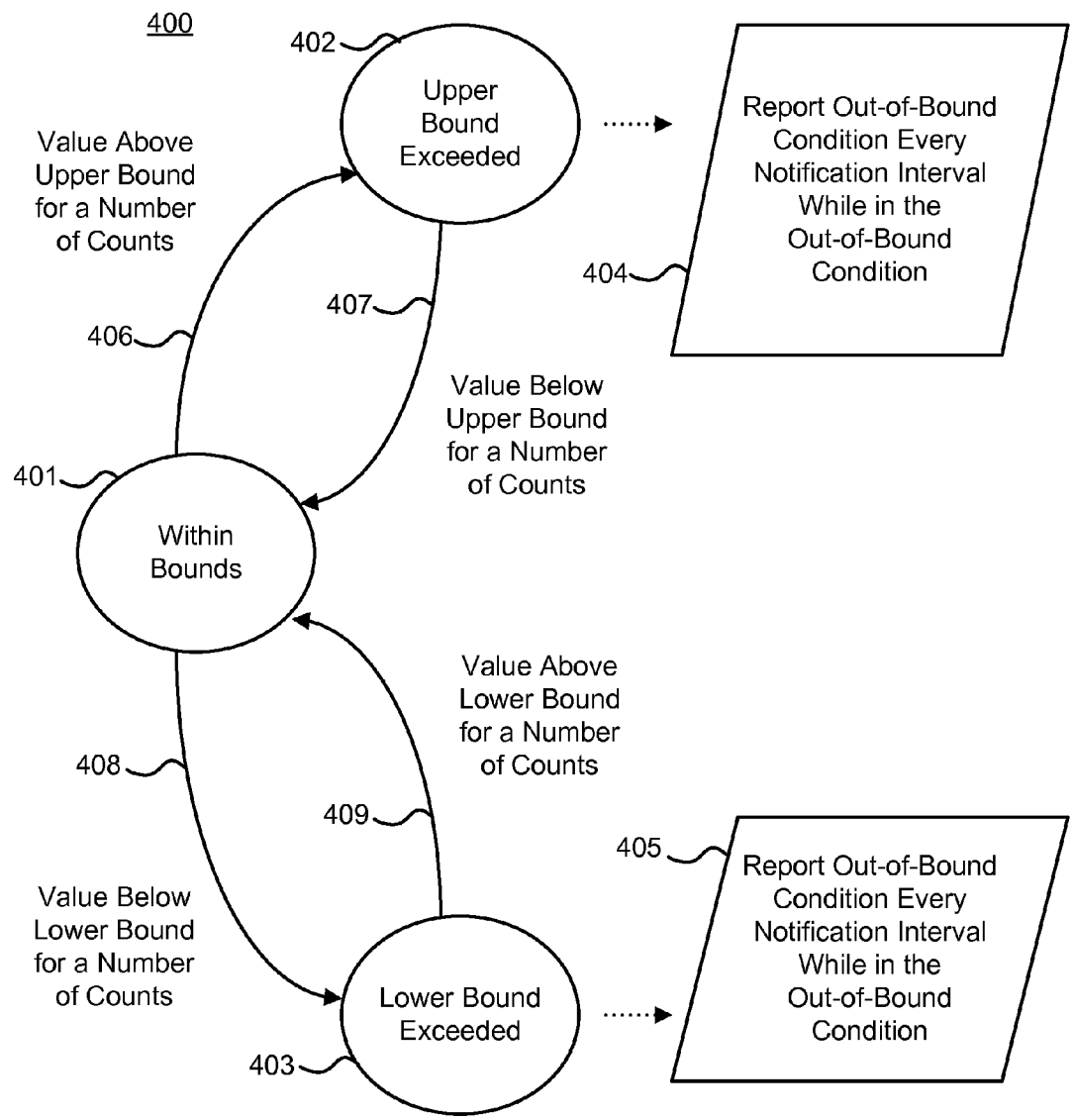
FIG. 4 is a state diagram illustrating a finite state machine in accordance with at least one embodiment.

FIG. 4 shows a finite state machine (FSM) 400 illustrated as having three states and four paths between states. When an information storage device parameter value is within bounds (e.g., a lower bound and an upper bound), the FSM 400 remains in state 401. While the FSM 400 is in state 401, if the information storage device parameter value exceeds an upper bound for a specified number of counts (e.g., measurements), the FSM 400 enters state 402, showing that the upper bound has been exceeded. Otherwise, the FSM 400 remains in state 401. While the FSM 400 is in state 402, if the information storage device parameter value is below the upper bound for a specified number of counts (e.g., measurements), the FSM 400 enters state 401, showing that the information storage device parameter value is within bounds. Otherwise, the FSM 400 remains in state 402. While the FSM 400 is in state 401, if the information storage device parameter value is below a lower bound for a specified number of counts (e.g., measurements), the FSM 400 enters state 403, showing that the lower bound has been exceeded. Otherwise, the FSM 400 remains in state 401. While the FSM 400 is in state 403, if the information storage device parameter value is above the lower bound for a specified number of counts (e.g., measurements), the FSM 400 enters state 401. Otherwise the FSM 400 remains in state 403.

In response to the FSM 400 entering state 402, the information storage device reports an out-of-bound condition every notification interval while the out-of-bound condition persists (e.g., while the FSM 400 remains in state 402). In response to the FSM 400 entering state 403, the information storage device reports an out-of-bound condition every notification interval while the out-of-bound condition persists (e.g., while the FSM 400 remains in state 403).

FIG. 5 shows a mode page 500 that includes a number of bytes (e.g., bytes 510-521). Each byte comprises a number of bits (e.g., bits 501-508). In the illustrated example, the twelve bytes of eight bits each provides a mode page comprising 96 bits of information. Some of the information of the mode page 500 identifies, describes, or otherwise aids in processing of the mode page 500, such as page code 531, shown as being expressed in the six least significant bits (LSBs) of byte 510, and page length 536, shown as being expressed in byte 511. Some of the information of the mode page 500 provides specifications of reporting criteria, such as positive parameter value range 553, shown as being expressed in byte 517, and negative parameter value range 554, shown as being expressed in byte 518. Mode page 500 may also include information to qualify the relationship of information storage device parameter values to reporting criteria, such as hysteresis count value 546. Mode page 500 may also include information specifying logical relationships between indications obtained from comparing information storage device parameter values to reporting criteria. Such logical relationships may be used to make alert notifications conditioned upon multiple reporting criteria and the information storage parameter values to which they are being compared.

In the exemplary embodiment depicted in FIG. 5, the mode page 500, which may be implemented, for example, as a SCSI mode page, comprises page code 531, subpage format (SPF) bit 532, parameters saveable (PS) bit 533, page length value 536, reserved area 541, method of reporting informational exceptions override (MRIEO) value 542, temperature notification enable (TNE) bit 543, current temperature as base (CTB) bit 544, hysteresis count value 546, internal update frequency timescale (IUFT) value 547, reserved area 548, notification interval value 551, baseline parameter value 552, positive parameter value range 553, negative parameter value range 554, current parameter value 555, positive range excursion (PRE) bit 561, negative range excursion (NRE) bit 562, reserved area 563, temperature-activated mode (TAM) code 564, and TAM bit 565. The parameter may be any parameter that may be monitored using information accessible to the information storage device, for example, temperature, vibration, head flight height, diagnostic data, and the like. As an example, information elements of the mode page will be described below with respect to temperature notification behavior. Such a mode page may be implemented and stored in the SCSI target device while being manipulated by an initiator.

If set, the current temperature as base (CTB) bit 544 indicates that the device server should use the current temperature reading as the baseline temperature.

If the temperature notification enable (TNE) bit=0, then the internal update process is disabled, and no temperature notification is made. If TNE bit=1, then notification of temperature changes shall be made at the intervals specified by the notification interval value as long as the temperature of the device falls outside the extent of the positive parameter value range or the negative parameter value range. Notification shall stop if the temperature of the device changes so as to fall within the extent of the positive parameter value range or the negative parameter value range.

A method of reporting informational exceptions override (MRIEO) value indicates that the device server should asynchronously report temperature changes as specified in this page regardless of the method of reporting informational exceptions (MRIE) setting in the information exceptions control mode page.

An internal update frequency timescale (IUFT) value specifies the units of time to apply to the internal update frequency. The values are defined as follows: a hysteresis count (HystCount) value specifies the number of times that the temperature reading measured by the internal update must be outside the specified temperature boundary before initiating the notification process, if the previous temperature reading had been inside the boundary. A notification interval value specifies the time interval to be used when reporting successive out-of-bound temperature conditions. An internal update frequency value specifies the interval for the device to use for the measurement of its temperature. A baseline temperature value specifies the temperature values (in degrees C.) from which the positive range value and the negative range value will extend. Any internal temperature value within this range will not cause an asynchronous notification. As an example, the baseline temperature may be a 16-bit signed value.

A positive parameter value range, which may, for example, be specified in degrees Celsius, provides the portion of the nominal temperature range above the Baseline Temperature. A negative parameter value range, which may, for example, be specified in degrees Celsius, provides the portion of the nominal temperature range below the baseline temperature value. A setting of FFh disables the reporting of temperature excursion for that range. A current temperature value is the temperature measured at the time the notification is made. A temperature-activated mode (TAM) bit is a flag that, when set to 1, indicates that the device is currently operating in a special mode that was activated by a high or low temperature condition. An example is that the TAM bit may be active when the information storage device is configured to use artificially increased seek times for the purpose of allowing voice coil motor cooling. A TAM code is set by the device to indicate the type(s) of temperature-activated modes in which the drive is currently operating. A negative range excursion (NRE) bit is a flag set by the device to indicate that the internal temperature is currently outside the negative temperature boundary. The NRE bit is set to 1 when the negative temperature boundary is exceeded, and is cleared to 0 when the temperature is inside the negative temperature boundary. A positive range excursion (PRE) bit is a similar flag for the positive temperature boundary. The temperature notification shall be made using SCSI sense data, or other methods. The temperature notification data includes information such as the current temperature, whether it is a positive or negative range excursion, the number of degrees beyond the positive or negative range, and, optionally, information on the previous notification (e.g., previous temperature, amount of temperature change since the previous notification, time interval since the previous notification, and the like). It may also report the contents of the temperature notification mode page.

Figure 6:
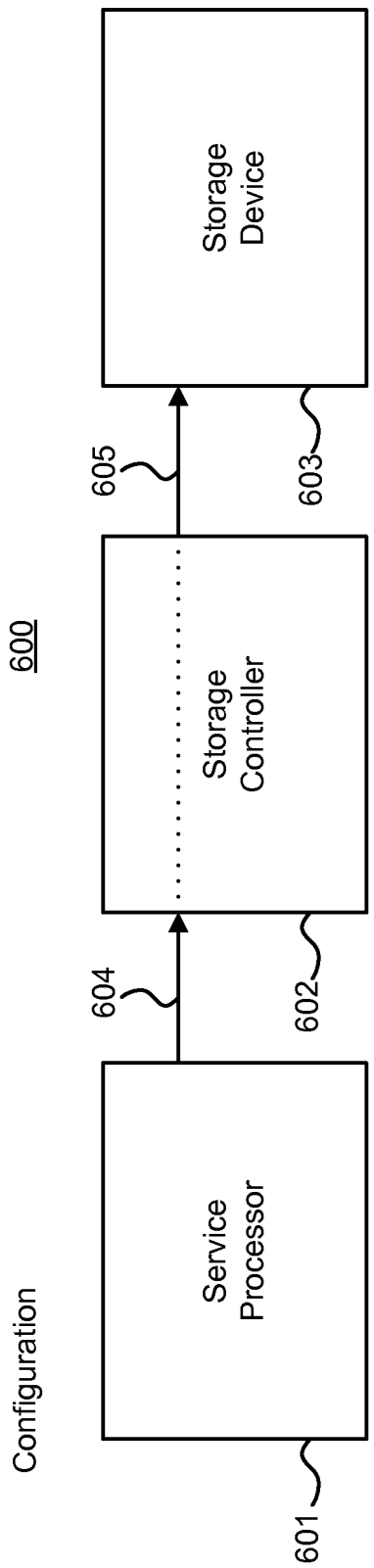
FIG. 6 is a block diagram illustrating a system for configuring an information storage device in accordance with at least one embodiment.

FIG. 6 shows a system 600 for configuring an information storage. System 600 includes service processor 601, storage controller 602, and information storage device 603. Service processor 601 provides configuration information via I/O bus 604 to storage controller 602. Storage controller 602 provides configuration information via I/O bus 605 to information storage device 603. The configuration information may include, for example, reporting criteria and logical relationships between such reporting criteria or indications obtained from comparing such reporting criteria to information storage device parameter values. As an example, the information of the mode page of FIG. 5 may be provided to information storage device 603 to configure information storage device 603 to provide an alert notification.

Figure 7:
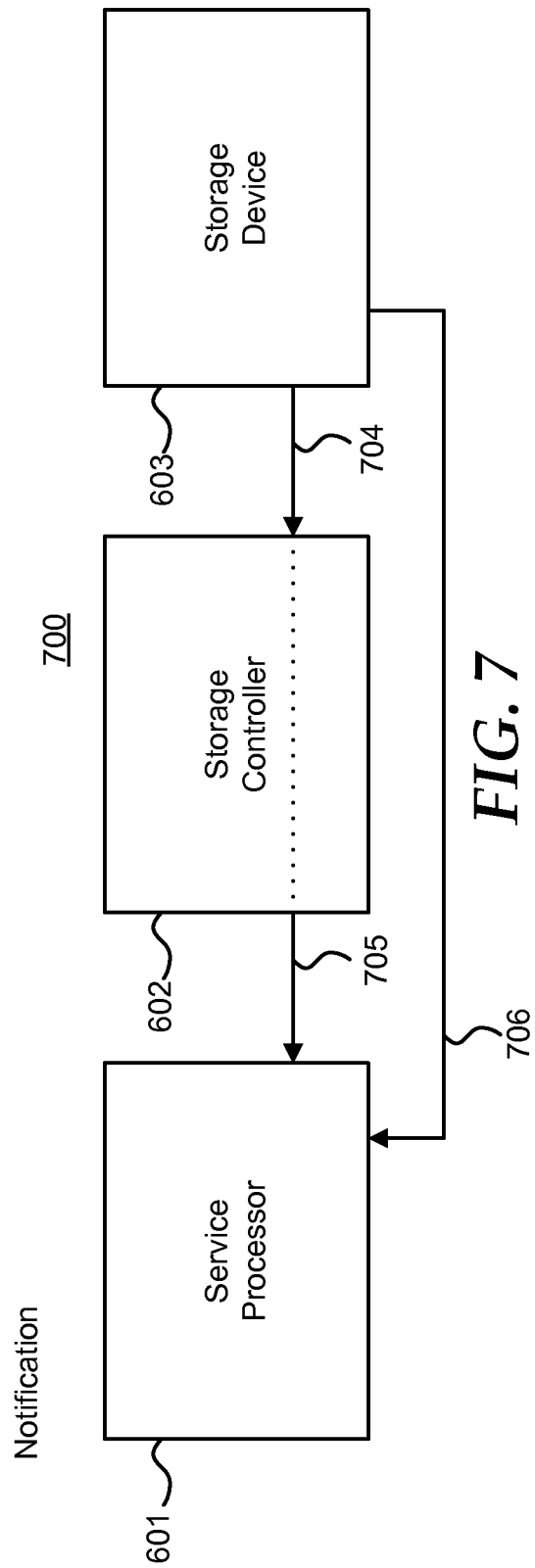
FIG. 7 is a block diagram illustrating a system for providing notification from an information storage device in accordance with at least one embodiment.

FIG. 7 shows a system 700 for providing notification from an information storage device. System 700 includes service processor 601, storage controller 602, and information storage device 603. Information storage device 603 provides an alert notification. Information storage device 603 may provide the alert notification, for example, via an I/O bus 704 coupled to the information storage device 603 or, for example, via an electrical conductor 706 distinct from the I/O bus 704. As an example, information storage device 603 may provide an alert notification via I/O bus 704 to storage controller 602. Storage controller 602 may provide the alert notification via I/O bus 705 to service processor 601. As another example, information storage device 603 may provide an alert notification via electrical conductor 706 to service processor 601. As another example, information storage device 603 may be connected to storage controller 602 via an electrical conductor distinct from I/O 704, and information storage device 603 may provide an alert notification via such an electrical conductor to storage controller 602. Optionally, storage controller 602 may provide an alert notification via I/O bus 705 or via an electrical conductor distinct from I/O bus 705 to service processor 601.

In accordance with at least one embodiment, an asynchronous notification mechanism for communication of information storage device status communication is provided. In accordance with at least one embodiment, an information storage device collects and reacts to temperature changes in a much more timely manner than with a polling mechanism. In accordance with at least one embodiment, fine grain control of the detection and notification, including the timing of the notification, of information storage device status changes by the information storage device itself is provided. At least one embodiment avoids the need to interrogate/poll the end device for temperature information by implementing independent programmable thermal monitoring within the end-device. As the temperature fluctuates the end-device may asynchronously notify the controller of the change, per the programmed settings. The interface to configure this behavior in the end-device complies with existing standards, while being robust enough to support many varied adaptations. At least one embodiment uses programming a mode page, such as a SCSI mode page, for setting parameters and uses sense information, such as SCSI sense information, for transmission of information from the drives.

At least one embodiment provides real-time temperature change feedback into the thermal control system. The end-device provides thermal updates in response to the temperature crossing certain programmed thermal boundaries, or in response to the temperature changing by a programmed amount from the previous reported temperature.

In accordance with at least one embodiment, new functionality is provided for boundary condition reporting by information storage devices. For example, an information storage device may allow programmable criteria and programmable logical relationships of such criteria and may, for example, use an interface signal (e.g., connector pin P11, distinct from the normal data and control communication path—"Out of Band") as a means of notifying a system processor that the information storage device is currently exceeding an operating condition boundary. The system processor can query the information storage device to determine the reason for the notification.

In accordance with at least one embodiment, an alert notification is sent from an information storage device via an electrical conductor, for example, the P11 conductor described in U.S. patent application Ser. No. 13/471,889, filed May 15, 2012, entitled "SYSTEMS AND METHODS FOR OUT OF BAND NOTIFICATION OF HARD DRIVE STATUS CHANGE," the entirety of which is incorporated by reference herein. In accordance with at least one embodiment, an alert notification is sent from an information storage device as SCSI sense data. An alert notification sent as SCSI sense data can be read and interpreted by a storage controller communicatively coupled to the information storage device or passed on to a control system interface further up a software stack. In accordance with at least one embodiment, the software stack may be software stack of the storage controller. In accordance with at least one embodiment, the software stack may be a software stack of a general purpose processor communicatively coupled to the storage controller. While the term "software stack" is used, the execution of instruction-based program code on the apparatus on which the software stack is implemented may be considered an implementation of a special-purpose apparatus to perform the function of the software stack. As an example, the execution of instruction-based program code on a general-purpose processor to implement the software stack may allow the general-purpose processor to act, with respect to the functionality of the software stack, as special-purpose apparatus to provide such functionality. One example of a communication channel between such special-purpose apparatus (e.g., a service processor used to implement a software stack) and a storage controller is a I2C-based communication interface. In another example, a software stack implemented on a processor may communicate with a storage controller via a defined host programming interface for management purposes.

In accordance with at least one embodiment, the HDD/SSD itself takes on new functionality beyond a simple alert that a boundary condition has been exceeded. The following parameters can be programmed and used by the information storage device to determine when an alert needs to be sent: a settable boundary; both an upper bound and a lower bound; controlled hysteresis; criteria pertaining to multiple information storage device parameters, even parameters available only internally within the information storage device; programmable logical relationships of the criteria; interaction with the information storage device's SMART alert subsystem; programmable dependency on a level of activity of the information storage device.

As an example, a settable boundary may be communicated to the information storage device, and the information storage device may then autonomously monitor an information storage device parameter to determine if the settable boundary has been crossed. While a fixed boundary provides a pre-programmed fixed alert condition, allowing the alert level to be programmable, operation that is more flexible and more adaptable to dynamic situations may be provided. For example, a system-level policy of allowing warmer operation at an acceptable lowered MTBF may make sense in some situations. Allowing the drive to be programmed with the temperature limit permits the same drive to be used in multiple temperature environments.

As another example, both an upper bound and a lower bound can be set as alert conditions. For example, in fresh air cooling data center operations where an idling drive might cool down during a frigid night to a temperature below its optimal operating bound, a lower bound could alert a system processor to initiate activity with the drive to warm it up before it becomes fully operational and an upper bound could alert the system processor of excessive temperatures, which might be caused, for example, by a fan failure, among many other possible causes.

As another example, controlled hysteresis may be provided to qualify indications that, once qualified, may result in a alert notification being issued. As lack of controlled hysteresis in closed loop systems (such as cooling fan speed control) may lead to instability, adding controlled hysteresis can assure stability. For example, the information storage device can be programmed to withhold the reporting of a boundary-exceeded condition until the transition has been stable for a programmable amount of time.

As another example, numerous conditions may be monitored. Such conditions may include environmental conditions (e.g., temperature, humidity, barometric pressure, vibration, and the like), conditions for which information is communicated outside the information storage device, and conditions for which information is not communicated outside the information storage device. Accordingly, any arbitrary condition can be monitored. As an example, whether or not the fly height of the read/write head is close to a limit may be monitored. As another example, whether or not the operating lifetime of an solid-state disk (SSD) device is close to being reached may be monitored.

As another example, programmable boundary types may be monitored. A boundary (or more than a single boundary) can be programmed beyond a simple "threshold exceeded" boundary. For example, a boundary can be based on time, event count, or event rate (e.g., frequency of occurrence of a particular event). As an example, an alert notification can be tied to any internal drive condition (or combination of conditions) regardless of whether or not it is normally exposed outside the device. As an example, an alert notification may be conditioned upon a logical combination of a "vibration boundary" AND a "raw bit error rate" OR a "position error" signal level.

As another example, an alert notification can be tied to the storage device's Self-Monitoring, Analysis, and Reporting Technology (SMART) alert subsystem. An embodiment applied to the SMART subsystem, either alone or in combination with other alert notification criteria, could eliminate the need for polling the drive for SMART trips. For example, polling an information storage device for SMART trips may happen 12×60×24=17,280 times each day for each storage device, and there may be, for example, 24 drives in a chassis, such as in an exemplary Dell PERC configuration, so avoiding the need for such polling could avoid a significant amount of communication with storage devices.

As another example, alert notification criteria may be tied to a drive's level of activity. For example, a drive may be programmed to withhold an alert notification for temperature or vibration if the drive's duty cycle is decreasing (which may, for example, lead naturally to a decrease in the drive's operating temperature). Programming a drive to consider its state and any operational trends it may be experiencing can further reduce the need to poll the device and thereby avoid interrupting the efficient sequencing of I/O commands within the drive's command queue.

In accordance with at least one embodiment, power savings can be realized by reducing communications with information storage devices, for example, by reducing or eliminating polling of the status of the information storage devices. As another example, power savings can be realized by utilizing "fresh air" cooling, where information handling systems may be operated over a broad range of temperatures, with more detailed environmental information from information storage devices allowing the information handling systems to coordinate system activities, such as the operation of cooling fans and the operation of information storage devices to optimize performance over the broad range of temperatures at which the systems may operate.

At least one embodiment may be used to provide embedded (e.g., agent-less) server management. By facilitating effective communication of alert notification criteria and alert notifications between a processor of an information handling system and an information storage device of the information handling system, at least one embodiment may be used to provide management of the information storage device without the need for the processor to actively solicit (e.g., poll) status information from the information storage device on an ongoing basis. In accordance with at least one embodiment, higher performance may be obtained by minimizing the overhead of additional information communicated to obtain the status information from the information storage device, and faster response to changes in status information can be obtained by allowing the information storage device to transmit an alert notification quicker than it would be able to respond to a polling request under a polling-based paradigm.

At least one embodiment may be implemented for an information storage device that uses at least a portion of a SCSI command set for communication of information via its I/O bus. As an example, the information storage device may receive alert notification criteria and logical relationships to be applied to the alert notification criteria via at least a portion of a SCSI command set, for example, via a SCSI mode page transmitted via the I/O bus. As another example, the information storage device may transmit an alert notification using at least a portion of a SCSI command set, for example, via SCSI sense data transmitted via the I/O bus. Alternatively, the information storage device may receive alert notification criteria and logical relationships to be applied to the alert notification criteria using at least a portion of a SCSI command set, for example, via a SCSI mode page transmitted via the IO bus, but transmit an alert notification via an electrical conductor distinct from the IO bus, thereby allowing alert notification to avoid impairing the bandwidth of the IO bus.

At least one embodiment asynchronously provides alert notifications in response to parameter changes rather than requiring polling. Such an embodiment may be implemented by configuring to the information storage devices to autonomously monitor parameter values, to autonomously compare the parameter value to reporting criteria, to autonomously apply logical relationships to indications obtained by such comparisons, and to autonomously provide an alert notification in response to the satisfying of such logical relationships; by configuring the storage controller to receive such alert notifications and to pass the alert notifications to control subsystems, such as the thermal control subsystem; and by configuring the control subsystems to receive such alert notifications and act upon them to obtain detailed information concerning the cause of a alert notification and to perform appropriate control functions in response to receiving the alert notifications or the detailed information.

In accordance with at least one embodiment, an information handling system comprises a processor, a memory communicatively coupled to the processor, and an information storage device communicatively coupled to the processor via an I/O bus for communicating I/O data between the processor and the information storage device. The information storage device is configured to receive a specification of reporting criteria for a plurality of information storage device parameters, to receive a specification of logical relationships for the reporting criteria, to monitor information storage device parameter values for the plurality of information storage device parameters, to compare the information storage device parameter values to the reporting criteria to obtain indications of whether the reporting criteria have been satisfied, to apply the logical relationships to the indications, and, in response to the logical relationships applied to the indications yielding a first result, to transmit an alert notification to the processor. In accordance with at least one embodiment, the alert notification is transmitted to the processor by applying the alert notification to an electrical conductor coupled to the information storage device.

In accordance with at least one embodiment, the alert notification is transmitted sua sponte by the information storage device. In accordance with at least one embodiment, the information storage device is configured to transmit the alert notification to the processor via the I/O bus. In accordance with at least one embodiment, the I/O bus comprises the electrical conductor. In accordance with at least one embodiment, the information storage device is configured to transmit the alert notification to the processor via an electrical conductor distinct from the I/O bus. In accordance with at least one embodiment, the electrical conductor is exclusively dedicated to communicating the alert notification. In accordance with at least one embodiment, the information storage device is further configured to apply hysteresis to the indications. In accordance with at least one embodiment, the information storage device is further configured to count a number of the indications exceeding a bound to qualify the indications to apply hysteresis to the indications. In accordance with at least one embodiment, the information storage device receives the specification of the reporting criteria for the plurality of information storage device parameters via a mode page received over the I/O bus. In accordance with at least one embodiment, the alert notification is applied to an electrical conductor distinct from the I/O bus asynchronously with respect to the mode page received over the I/O bus.

In accordance with at least one embodiment, a method comprises receiving, at an information storage device, a specification of reporting criteria for a plurality of information storage device parameters; receiving a specification of logical relationships for the reporting criteria; monitoring information storage device parameter values for the plurality of information storage device parameters; comparing the information storage device parameter values to the reporting criteria to obtain indications of whether the reporting criteria have been satisfied; applying the logical relationships to the indications; and, in response to the logical relationships applied to the indications yielding a first result, transmitting an alert notification as an electromagnetic signal. In accordance with at least one embodiment, the transmitting the alert notification comprises applying the alert notification to an electrical conductor coupled to the information storage device. In accordance with at least one embodiment, the alert notification is transmitted sua sponte by the information storage device. In accordance with at least one embodiment, the information storage device is coupled to an I/O bus, wherein the transmitting the alert notification as the electromagnetic signal occurs on the I/O bus. In accordance with at least one embodiment, the I/O bus comprises the electrical conductor. In accordance with at least one embodiment, the information storage device is coupled to an I/O bus, wherein the transmitting the alert notification as the electromagnetic signal occurs over an electrical conductor distinct from the I/O bus. In accordance with at least one embodiment, the electrical conductor is exclusively dedicated to the transmitting the alert notification as the electromagnetic signal. In accordance with at least one embodiment, the method further comprises applying hysteresis to the indications. In accordance with at least one embodiment, the applying hysteresis comprises counting a number of the indications exceeding a bound to qualify the indications. In accordance with at least one embodiment, the receiving, at the information storage device, the specification of the reporting criteria for the plurality of information storage device parameters occurs via a mode page received over an I/O bus coupled to the information storage device. In accordance with at least one embodiment, the transmitting the alert notification as the electromagnetic signal occurs asynchronously with respect to the mode page received over the I/O bus.

In accordance with at least one embodiment, a method comprises receiving, at an information storage device, a mode page comprising reporting criteria for a plurality of information storage device parameters and logical relationships for the reporting criteria; monitoring information storage device parameter values for the plurality of information storage device parameters; in response to the logical relationships applied to comparisons of the information storage device parameter values to the reporting criteria, transmitting an alert notification as an electromagnetic signal. In accordance with at least one embodiment, the transmitting the alert notification comprises applying the alert notification to an electrical conductor coupled to the information storage device. In accordance with at least one embodiment, the receiving, at the information storage device, the mode page comprising the reporting criteria for the plurality of information storage device parameters and logical relationships for the reporting criteria occurs via an I/O bus coupled to the information storage device, and wherein the transmitting the alert notification as the electromagnetic signal occurs via the I/O bus. In accordance with at least one embodiment, the I/O bus comprises the electrical conductor.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a processor;
a memory communicatively coupled to the processor; and
an information storage device communicatively coupled to the processor via an input/output (I/O) bus for communicating I/O data between the processor and the information storage device, the information storage device configured to receive a specification of reporting criteria for a plurality of information storage device parameters, to receive a specification of logical relationships for the reporting criteria, to monitor information storage device parameter values for the information storage device parameters, to compare the information storage device parameter values to the reporting criteria to obtain indications of whether the reporting criteria have been satisfied, to apply hysteresis to the indications, to apply the logical relationships to the indications and, in response to the logical relationships applied to the indications yielding a first result, to transmit an alert notification to the processor.

2. The information handling system of claim 1, wherein the alert notification is transmitted sua sponte by the information storage device.

3. The information handling system of claim 1, wherein the information storage device is configured to transmit the alert notification to the processor via the I/O bus.

4. The information handling system of claim 1, wherein the information storage device is configured to transmit the alert notification to the processor via an electrical conductor distinct from the I/O bus.

5. The information handling system of claim 4, wherein the electrical conductor is exclusively dedicated to communicating the alert notification.

6. The information handling system of claim 1, wherein the information storage device is further configured to count a number of the indications exceeding a bound to qualify the indications to apply hysteresis to the indications.

7. The information handling system of claim 1, wherein the information storage device receives the specification of the reporting criteria for the plurality of information storage device parameters via a mode page received over the I/O bus.

8. The information handling system of claim 1, wherein the alert notification is applied to an electrical conductor distinct from the I/O bus asynchronously with respect to the mode page received over the I/O bus.

9. A method comprising:
receiving, at an information storage device, a specification of reporting criteria for a plurality of information storage device parameters;
receiving a specification of logical relationships for the reporting criteria;
monitoring information storage device parameter values for the information storage device parameters;
comparing the information storage device parameter values to the reporting criteria to obtain indications of whether the reporting criteria have been satisfied;

applying hysteresis to the indications;

applying the logical relationships to the indications; and in response to the logical relationships applied to the indications yielding a first result, transmitting an alert notification as an electromagnetic signal.

10. The method of claim 9, wherein the alert notification is transmitted sua sponte by the information storage device.

11. The method of claim 9, wherein the information storage device is coupled to an input/output (I/O) bus, wherein the transmitting the alert notification as the electromagnetic signal occurs on the I/O bus.

12. The method of claim 9, wherein the information storage device is coupled to an input/output (I/O) bus, wherein the transmitting the alert notification as the electromagnetic signal occurs over an electrical conductor distinct from the I/O bus.

13. The method of claim 12, wherein the electrical conductor is exclusively dedicated to the transmitting the alert notification as the electromagnetic signal.

14. The method of claim 9, wherein applying hysteresis comprises:

counting a number of the indications exceeding a bound to qualify the indications.

15. The method of claim 9, wherein the receiving, at the information storage device, the specification of the reporting criteria for the plurality of information storage device parameters occurs via a mode page received over an I/O bus coupled to the information storage device.

16. The method of claim 9, wherein the transmitting the alert notification as the electromagnetic signal occurs asynchronously with respect to the mode page received over the I/O bus.

17. A method comprising:

receiving, at an information storage device, a mode page comprising reporting criteria for a plurality of information storage device parameters and logical relationships for the reporting criteria;

monitoring information storage device parameter values for the plurality of information storage device parameters; and in response to the logical relationships applied, in conjunction with applying hysteresis, to comparisons of the information storage device parameter values to the reporting criteria, transmitting an alert notification as an electromagnetic signal.

18. The method of claim 17, wherein the receiving, at the information storage device, the mode page comprising the reporting criteria for the plurality of information storage device parameters and logical relationships for the reporting criteria occurs via an input/output (I/O) bus coupled to the information storage device, and wherein the transmitting the alert notification as the electromagnetic signal occurs via the I/O bus.

19. The method of claim 17, wherein the alert notification is transmitted sua sponte by the information storage device.

20. The method of claim 17, wherein the transmitting the alert notification as the electromagnetic signal occurs asynchronously with respect to the receiving, at the information storage device, the mode page.

* * * * *